UNITED STATES PATENT OFFICE.

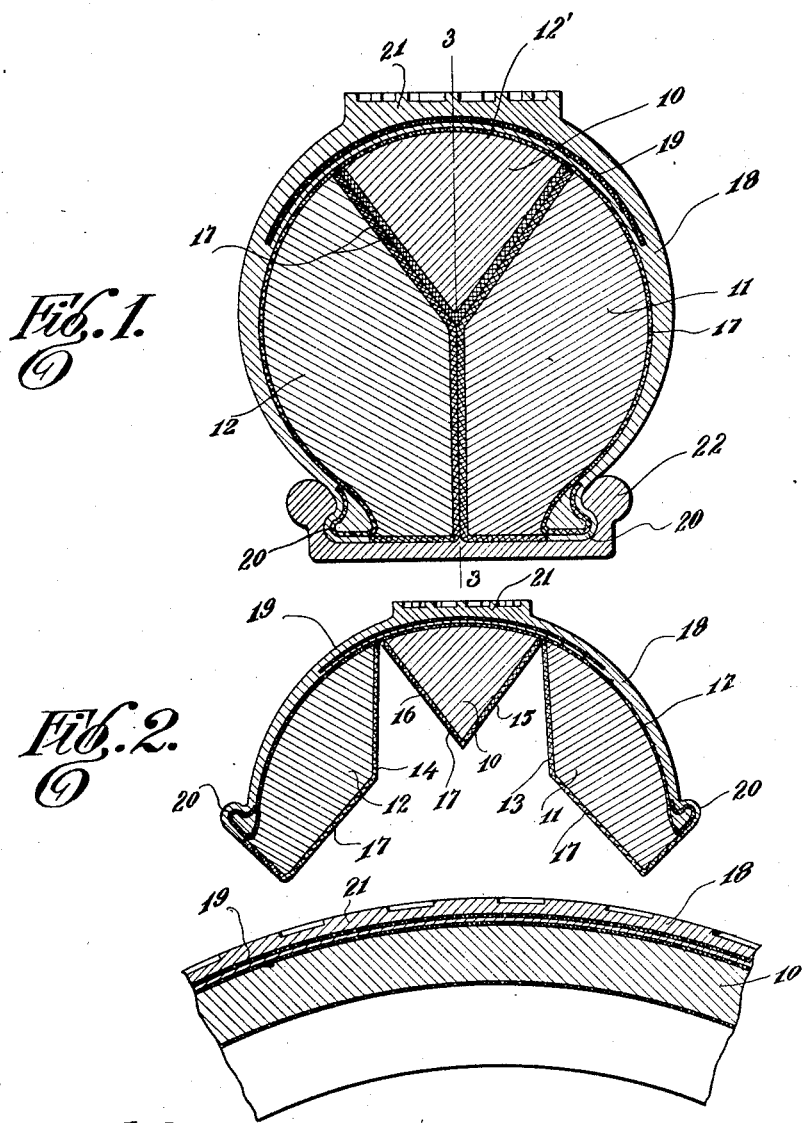

MICHAEL E. OSBORN AND JOHN R. WOLLAM, OF MIDLAND, PENNSYLVANIA.

AUTOMOBILE-TIRE.

1,380,496.  Specification of Letters Patent.  Patented June 7, 1921.

Application filed October 8, 1920. Serial No. 415,617.

*To all whom it may concern:*

Be it known that we, MICHAEL E. OSBORN and JOHN R. WOLLAM, citizens of the United States, residing at Midland, in the county of Beaver, State of Pennsylvania, have invented certain new and useful Improvements in Automobile-Tires; and we do hereby declare the following to be a full, clear, and exact description of the invention, such as will enable others skilled in the art to which it appertains to make and use the same.

This invention relates to new and useful improvements in tires and particularly to resilient tires for automobiles.

One object of the invention is to provide a solid rubber tire which is capable of being attached to a rim in the manner of the clencher pneumatic tires now in use.

Another object is to provide a tire of this character which has all of the resilient characteristics of the solid rubber tire, and a large amount of the elasticity of the pneumatic tire.

Another object is to provide a tire of this character which is readily capable of being retreaded so that the tire will have a long life.

Other objects and advantages will be apparent from the following description when taken in connection with the accompanying drawing.

In the drawing:

Figure 1 is a transverse sectional view through the tire applied to a clencher rim.

Fig. 2 is a transverse sectional view through the tire as it appears before being placed on the rim.

Fig. 3 is a vertical longitudinal central sectional view through a portion of the tire on the line 3—3 of Fig. 1.

Referring particularly to the accompanying drawing the center or core portion of the tire consists of three sections 10, 11, and 12, the former of which is triangular in cross section and has its base 12' curved to conform to the outer curved contour of the cross section of the entire tire, and forms the tread portion of the tire. The sections 11 and 12 are identical in cross sectional outline, their outer sides being curved to conform to the curvature of the tire, while their inner sides 13 and 14 are formed at an obtuse angle to abut respectively against each other and against the inclined side faces 15 and 16 of the section 10. The sections 10, 11, and 12 are formed of good live rubber vulcanized in connection with a fabric 17, and around the curved sides of the sections, and vulcanized thereto, is the outer or shoe portion 18 of the tire. This shoe 18 is formed of live rubber in which is embedded a strip of fabric 19, said strip extending across the tread face of the tire and to points approximately half way up the sides of the tire. The outer corners of the sections 11 and 12 are formed with the clencher beads 20.

An extra thickness of pure live rubber 21 is vulcanized to the tread face of the tire and such rubber is molded in the form of a chain, or other suitable or desired design to form an anti-skidding face.

Normally the tire, before being applied to the rim, is in the form shown in Fig. 2, with the mutually adjacent faces of the different sections out of contact with each other, so that it is necessary to compress the sections against each other to engage the beads 20 with the flanges of the rim 22. The sections are thus firmly compressed so that the core of the tire is in effect a solid unit, but possessing the free elasticity and lateral movement not present in the ordinary solid rubber tires.

What is claimed is:

1. A resilient tire comprising a core formed of a plurality of circumferentially extending sections the outermost of which is triangular in cross section with its base curved to conform to the tread of the tire, the other sections having outer curved sides conforming to the transverse curvature of the tire and sides abutting the sides of the first section and each other throughout the lengths of said sides, and an inclosing shoe portion vulcanized to the curved sides of the sections and forming a part of the tire, the faces of the outermost section and the faces of the other sections which abut therewith emanating directly from the said shoe portion.

2. A resilient tire comprising a core formed of a plurality of circumferentially extending sections the outermost of which is triangular in cross section with its base curved to conform to the tread of the tire, the other sections having outer curved sides conforming to the transverse curvature of the tire and sides abutting the sides of the first section and each other, the said abutting faces having a fabric facing vulcanized thereon, and an inclosing shoe portion of rubber having a fabric member vulcanized therein adjacent its outer peripheral face.

In testimony whereof, we affix our signatures, in the presence of two witnesses.

MICHAEL E. OSBORN.
JOHN R. WOLLAM.

Witnesses:
HIRAM RIGBY,
W. L. POLK, Jr.